(12) United States Patent
Delev (10) Patent No.: US 12,122,312 B2
(45) Date of Patent: Oct. 22, 2024

(54) VEHICLE IMPACT DETECTION SYSTEM

(71) Applicant: Tsvetan Ivanov Delev, London (GB)

(72) Inventor: Tsvetan Ivanov Delev, London (GB)

( * ) Notice: Subject to any disclaimer, the term of this patent is extended or adjusted under 35 U.S.C. 154(b) by 87 days.

(21) Appl. No.: 18/092,567

(22) Filed: Jan. 3, 2023

(65) Prior Publication Data

US 2023/0211746 A1 Jul. 6, 2023

(30) Foreign Application Priority Data

Jan. 2, 2022 (GB) ...................................... 2200011

(51) Int. Cl.
*B60R 21/0136* (2006.01)
*B60R 21/00* (2006.01)
*B60R 21/01* (2006.01)

(52) U.S. Cl.
CPC .. *B60R 21/0136* (2013.01); *B60R 2021/0027* (2013.01); *B60R 2021/01293* (2013.01)

(58) Field of Classification Search
CPC ........ B60R 21/0136; B60R 2021/0027; B60R 2021/01293; B60R 21/01; G08B 25/016
See application file for complete search history.

(56) References Cited

U.S. PATENT DOCUMENTS

| | | | |
|---|---|---|---|
| 7,954,359 B1 * | 6/2011 | Paderewski | F42B 12/365 73/12.09 |
| 9,646,428 B1 | 5/2017 | Konrardy et al. | |
| 10,586,122 B1 | 3/2020 | Gingrich et al. | |
| 11,012,667 B1 | 5/2021 | Nodder | |
| 2005/0273218 A1 | 12/2005 | Breed et al. | |
| 2012/0191375 A1 | 7/2012 | Soles et al. | |
| 2013/0194087 A1 | 8/2013 | Tomer | |
| 2013/0267194 A1 | 10/2013 | Breed | |
| 2017/0161971 A1 | 6/2017 | Chambers | |
| 2017/0322096 A1 * | 11/2017 | Pelt | G01P 15/122 |
| 2018/0176757 A1 | 6/2018 | Kaindl et al. | |
| 2022/0348192 A1 * | 11/2022 | Josephs | B60W 60/0015 |

FOREIGN PATENT DOCUMENTS

| | | |
|---|---|---|
| CN | 104742758 A1 | 7/2015 |
| EP | 3 543 074 A1 | 9/2019 |
| KR | 10 2013-0006910 | 1/2013 |
| KR | 10 2015-0117561 | 10/2015 |
| KR | 10 2018-0012208 | 2/2018 |
| KR | 10-1950927 | 2/2019 |
| KR | 10-2076043 | 3/2020 |
| WO | WO 2017/044972 A1 | 3/2017 |

OTHER PUBLICATIONS

UK/PO Search and Examination Report, Dec. 19, 2022 for priority GB 2200011.1.

* cited by examiner

*Primary Examiner* — James J Yang (74) *Attorney, Agent, or Firm* — Lippes Mathias LLP (57) ABSTRACT

A method and system for detecting a vehicle impact and automatically requesting emergency assistance is provided. The system comprises multiple impact sensors located on the vehicle. The impact sensors are configured to communicate with each other as well as with a main control unit.

15 Claims, 12 Drawing Sheets

VEHICLE IMPACT DETECTION SYSTEM

FIELD OF THE INVENTION

The present invention relates to a method and a system configured to detect when a vehicle impacts another object and to automatically inform a remote facility of the impact in the event that it is sufficiently severe to cause damage to the vehicle or injury to the driver and/or passengers.

BACKGROUND

Since 2018 all new cars and light vans sold in the European Union (EU) must be fitted with eCall systems which automatically alert the rescue or emergency responder services in the event of an accident. The system is activated as soon as onboard sensors detect an impact that exceeds a predetermined force. Once activated, the system dials an emergency number and establishes a telephone link with a remote facility or emergency call centre. Using satellite or cellular communication networks, the system communicates the time and place of the crash and the direction of travel of the vehicle to the remote facility, which enables emergency responders to get to the crash site faster.

A number of different eCall systems have been proposed. Most of the systems include impact sensors which monitor the magnitude of impact. If the impact force exceeds a pre-determined threshold value, the impact is classified as an accident and the system automatically communicates with a remote facility to request emergency assistance within a critical reaction time. WO 2017/0044972 discloses an automated vehicle impact detection system comprising a series of electrical resisters embedded onboard a vehicle during manufacture. The resisters comprise a network of traces of varying tensile strength laid out in sheets on the exterior frame of the vehicle. The sheets are structured to break in the event of a crash, which causes the network resistance in that area to increase. The change in resistance at the area of impact will provide information about the type and location of damage sustained by the vehicle. The system of WO2017/0044972 is, however, unable to determine the severity of an impact on a vehicle.

US 2012/0191375 discloses armoured vehicles comprising a plurality of resistive or conductive sensors located on a vehicle. The sensors are configured to detect the force and direction of impact or collision of an incoming projectile.

US 2018/0176757, US 2013/0267194, US 2013/0194087, KR20150117561, US 2017/0161971, CN104742758, KR 20180012208, KR102076043, KR20130006910 and KR 101950927 disclose systems and methods for providing a vehicle with automatic access to emergency aid in the event of an accident. The systems comprise a plurality of sensors located within the vehicle, at least one of which is configured to measure the severity of the impact or collision. The sensors are in communication with a telematics unit or central hub comprising a communications interface, a processor unit and a memory. The hub is configured to communicate with sensors within the vehicle and also with systems external to the vehicle. In the event that an impact sensor detects an impact that exceeds a threshold value, it communicates this fact to the hub, which automatically sends a crash notification to an identified third party. The systems may comprise optical, mechanical or acoustic crash detection sensors capable of detecting the speed, acceleration and deformation of a vehicle in the event of an accident and a global positioning satellite (GPS) sensor. Information regarding the identity and location of the vehicle and driver and their direction of travel can also be communicated to an emergency responder in the event of an accident.

A problem with many of these known systems is that the main control unit or central hub is configured to interact with each of the sensors individually to determine the severity of an impact. Because more sensors provide a more accurate measure of the impact, the large number of interactions between the hub and each sensor inevitably leads to long processing times, which can affect how quickly the emergency request is communicated to an emergency responder after impact. Attempts to reduce the processing time by reducing the number of sensors located on the car means that it is more difficult to determine the severity of the impact. There is therefore a need for a system and method that can quickly and accurately determine the severity of an impact and automatically communicate with an emergency response unit without delay within a critical reaction time.

SUMMARY

The present invention addresses that need for a system and method that can quickly and accurately determine the severity of an impact and automatically communicate with an emergency response unit without delay within a critical reaction time.

A first aspect of the invention provides a method for notifying a remote facility of a vehicle accident, the method comprising the steps of:
providing a system comprising impact sensors at multiple locations around the vehicle;
storing the locations of the impact sensors when the vehicle is stationary position to provide a library of stationary locations;
determining the location of each impact sensor in the event of an impact or collision;
determining if any sensor has been displaced from its stationary location as a result of the impact;
determining the severity of the impact by calculating the extent of displacement of each impact sensor from its stationary position; and
automatically informing the remote facility that there has been an accident if it is determined that the extent of displacement as a result of the impact is greater than a pre-determined value;
characterized in that each impact sensor is configured to communicate with at least one of the other impact sensors and the step of determining if any impact sensor has been displaced from its stationary location on impact includes the step of creating a communication path between an impact sensor and at least one of the other impact sensors thereby to determine the location of each impact sensor as a result of the impact and using the library of locations to compare the location of each impact sensor after impact or collision with its stationary location to determine an extent of displacement and if the extent of displacement exceeds a threshold value automatically informing the remote facility.

The step of creating a communication path to determine the location of an impact sensor includes the step of measuring the distance between the impact sensor and at least one other impact sensor. Preferably the distance between one impact sensors and at least two other impact sensors is measured. Better location accuracy is achieved by measuring distances between at least three impact sensors. In one embodiment the sensors may be arranged in triangular arrangements relative to each other within a group or the system. The distance between any one impact sensor and all the other impact sensors in the vehicle may also be measured, if appropriate.

Impact sensors that are configured to communicate with each other provide a quick and simple route to determining the extent of displacement of any one or a group of impact sensors in the event of an accident. This reduces in-system processing time, facilitates the quick and accurate determination of the severity of an impact and reduces the critical react time between the impact occurring and communicating with the remote responder. Where the impact is sufficiently severe to be classified as an accident, the method of the present invention helps to reduce the time taken by the emergency services to reach the site of the accident. Furthermore, because the method is able to determine the severity and location of the impact it can also forewarn the emergency services of the location of the accident and any hazards that they need to be aware of when they arrive.

A second aspect of the invention provides a system for notifying a remote facility of a vehicle accident, the system comprising a plurality of impact sensors configured to be located at multiple positions around the vehicle and means for collecting data output from the impact sensors and arranging for the data output to be sent to a remote facility. Preferably each impact sensor is configured to communicate with at least one of the other impact sensors to determine if it has been displaced from its stationary location on impact; in this respect each impact sensor is configured to determine its location on impact, compare its post-impact location with its pre-impact stationary location to determine an extent of displacement and determining if the extent of displacement exceeds a threshold value. The system can be installed in all types of vehicles such as, but not limited to, cars, sport utility vehicles (SUV), large goods vehicles (LGV), heavy goods vehicles (HGVs), coaches, buses, motorhomes, caravans, motorcycles, aircraft, mining vehicles, man-operated excavators or other movable plant or machinery. Communication between the system and the remote facility may be achieved via use of radio waves or micro-waves.

The terms "impact" and "collision" are used interchangeably throughout and should be understood to include an event in which an external object makes contact with or impinges on the vehicle.

By the term "location" it should be understood to mean the position of an impact sensor in terms of any suitable coordinate system (for example a cartesian (x, y, z), polar (r, θ, φ), cylindrical or spherical coordinate system) relative to a fixed point on the vehicle, preferably a fixed point relative to the safety cell (passenger cab) of the vehicle. Preferably the position of a sensor in the vehicle is measured relative to two fixed points in the vehicle. More preferably the position of a sensor within a vehicle is measured relative to three fixed points within the vehicle.

By the term "displacement" it should be understood to mean the difference in position measured with reference to a suitable coordinate system (for example, cartesian, polar, cylindrical or spherical) of an impact sensor after impact compared to the stationary position. This corresponds to the relative change of location of the impact sensor as a result of the impact.

By the term "threshold value" determined in relation to the post-impact displacement of the impact sensor it should be understood to mean a value which is determined with reference to a library of post-impact location data or a library of post-impact displacement data provided for the vehicle. The post-impact location or displacement data is generated as a result of factory crash testing or crash testing by an independent authorized agency. The crash testing generates a series of post-impact location values for each impact sensor, which reflect the magnitude of the impact force and therefore severity of the crash. Controlled post-impact displacement values can be determined by comparing the library of controlled post-impact location values with the library of stationary location values. These controlled post-impact location and displacement values are stored in a library for the vehicle and provide reference values against which the severity of an impact can be determined. A threshold value corresponds to a location or displacement value generated for a sensor as a result of a controlled impact having a force that a standardized testing procedure advises as being sufficient to cause damage to the vehicle and/or injury to the passengers. An impact force at or above the threshold value will typically require emergency assistance. The step of determining the extent of displacement of an impact sensor in the event of an impact (or accident) comprises comparing its post-impact location value with its designated stationary location value (in the library). The extent of displacement and the severity of the accident can be determined by comparing this displacement value with controlled displacement values calculated by comparing the post-impact library location values generated under controlled crash conditions for the sensor with its stationary library value. If the displacement values for the impact match or exceed a value sufficient to cause damage to the vehicle and/or injury to the passengers, the threshold value has been met and emergency assistance is required.

The system comprises a main control unit (MCU) which collects data output from the impact sensors. The MCU suitably comprise a water- and impact-resistant housing, internally situated receiving and transmitting means and optionally processing means, wherein the housing is configured to protect the internally situated means in the event of impact. Each of the plurality of impact sensors is configured to communicate with the MCU, either via wired connections (electrical or fibre-optic) or wirelessly. Preferably each of the impact sensors are configured for wireless communication with the MCU. The MCU may forward data output from the impact sensors to the remote facility, either directly or via a data processing interface provided in one of the electronic control units (ECU) of the vehicle. Alternatively, the main control unit may itself comprise a data processing interface to analyse the data output to determine if the impact can be classified as an accident requiring an emergency response before communicating with the remote facility, either directly or via one of the ECU of the vehicle. The MCU may comprise at least one of a central processing unit (CPU), random access memory (RAM), read only memory (ROM), an independent back-up battery, fuses, voltage smoother, back-up global positioning satellite (GPS) access, a GSM module, one or more communication card (e.g., SIM card) slots, an aerial and a cooling unit.

The main control unit has access to a database or library of predetermined location values for each impact sensor, including stationary location values corresponding to the location of impact sensor when the vehicle is in a stationary position and post-impact location values generated for each sensor in accordance with standardized controlled crash testing procedures. The library of location values may be stored by the main control unit or may be stored remotely and accessed by the main control unit. In the event of an impact having a severity greater than a predetermined threshold, the location value of one or more of the impact sensors may change from a stationary value to an impact value. Using the impact location value and the stationary location value for each sensor, the main control unit (MCU) determines the extent of displacement of each impact sensor due to the impact and calculates where the impact occurred on the vehicle and its severity. If the severity of the impact is greater than a threshold value, it will be classified as an accident, in which case the system automatically communicates the event to the remote facility. The system communicates with the remote facility in a number of ways including via satellite and radio communication. Preferably the main control unit communicates with the remote facility via cellular networks.

The system suitably constitutes part of an onboard network system comprising one or more electronic control units (ECU) incorporated in the vehicle. The onboard network system allows the vehicle to communicate with a number of external receivers via a plurality of communication paths. In particular, the onboard network system is configured to send and receive cellular or other communication signals, inclusive of heavy and light information data, via a plurality of communication paths. As part of the onboard network system, the main control unit (MCU) is suitably configured to communicate with one or more of the ECU of the vehicle. As discussed above, the MCU may be configured to communicate directly with the remote facility or may be configured to communicate with the remote facility via an ECU. Preferably the MCU collects sensor data from the ECUs and forwards it to the remote facility together with the impact data. In this way, as well as being able to communicate with the remote facility regarding the severity of the impact, the system can also transmit information generated by other sensors associated with one or more of the ECU of the vehicle. In this way the system can also transmit information regarding the vehicle identity, vehicle occupancy, the status of the engine and powertrain, tyre pressure (including whether the tyres are flat), vehicle speed at impact, fuel type, fuel tank status, airbag deployment and door-lock status. This additional information, collected before and immediately after impact, can provide an emergency responder with a further indication regarding the severity of the impact as well as about any hazards they might encounter at the scene of the accident.

The impact sensors are located at multiple points around the vehicle. Preferably, the impact sensors are located at the weak points on the body and/or frame structure of the vehicle. These are typically the areas on the surface or frame of the vehicle which deform as a result of an impact or collision. The impact sensors may additionally be placed at other locations throughout the vehicle. Each impact sensor comprises a water- and impact-resistant housing and internally situated sensing means, wherein the housing is configured to protect internally situated sensing means in the event of an impact. Each impact sensor is configured to communicate with at least one of the other impact sensors and also with the MCU; to this end each sensor suitably comprises a receiver and a transmitter to facilitate communication other impact sensors and also with the MCU. Preferably each impact sensor communicates with at least one and preferably at least two other impact sensors. Communication between each of the impact sensors and between the impact sensors and the MCU can be via wired or wireless paths. Preferably communication between impact sensors is via a wireless communication network. Preferably the impact sensors communicate between each other using a pre-determined signalling protocol. Preferably one or more of the impact sensors are wirelessly connected to the MCU.

The system suitably determines the location of a sensor by measuring the distance between the impact sensors. The locations of the impact sensors are suitably determined on starting the car (in a stationary position) and after impact to establish whether the location of the impact sensors have changes. The extent of displacement is determined by comparing the post-impact location of the impact sensor with the pre-impact location and comparing these differences with differences calculated using the post-impact values generated under controlled crash conditions. Preferably the severity of the impact is determined by calculating whether one or a group of impact sensors have been displaced by more than a threshold value. In one embodiment, the extent of displacement is preferably determined using lateration methods by measuring the distance between an impact sensor at an allocated position and at least two other impact sensors having their own allocated positions immediately after impact and using these distance measurements to determine the post-impact location of the impact sensor. The differences between the stationary and post-impact locations provides an indication of the extent of displacement which, in turn, indicates the severity of the impact in that position on the vehicle and whether it can be classified as an accident. The location of each impact sensor is calculated using a pre-determined signalling protocol; each impact sensor is allocated a position identity and signals are sent from that impact sensor to at least two other designated impact sensors having their own unique position identities to measure the distances between the impact sensors. Preferably signals are sent from each impact sensor to every other impact sensor in that part of the system. The distances are measured for the vehicle both in the stationary state and post-impact and are used to determine the stationary and post-impact location of each sensor. The post-impact location or each impact sensor is compared with the stationary impact location for each impact sensor so that the extent of displacement for individual sensors and groups of sensors can be determined.

Greater measurement accuracy can be achieved by increasing the number of distance measurements between any one impact sensor and other sensors in the system. Thus, in one embodiment, the method involves measuring the distance between any one of "n" impact sensors and each of the other "n–1" impact sensors within the system to determine the post-impact location of impact sensor "n". The post-impact location of impact sensor "n" is compared with its pre-impact location to determine an extent of displacement for that impact sensor. The process is repeated for each of the other impact sensors at location "2", "3", "4" . . . "n" until the distance between each sensor and every other sensor in the system is determined. These distance measurements are then used to determine whether any one impact sensor has been displaced due to the impact, and if so, the extent of the displacement.

In order to improve the speed at which the system determines whether the severity of the impact is sufficient for it to be classified as an accident, the impact sensors are arranged as groups on the vehicle. Thus, a first group of sensors are mounted at the front end of the vehicle with a second group at the rear of the vehicle. A third and fourth group of sensors can be mounted on each side of the vehicle. A final group of sensors may be located within the roof of the vehicle. Instead of measuring the distance between an allocated sensor and one or more sensors in the system, distances between selected sensors in a group or selected sensors between groups are measured using the pre-determined signalling protocol discussed above. In this way the post-impact location and extent of displacement of each impact sensor can be more rapidly determined. Each impact sensor may be provided with sufficient processing power to determine its location from distance measurements. Alternatively, each sensor transmits the relevant distance measurements to the main control unit (MCU) which then processes the information to determine location.

In addition to impact sensors, the system may further include one or more additional sensors configured to measure parameters such as moisture, pressure, temperature and carbon monoxide levels within the vehicle. The moisture and pressure sensors may be used to detect whether the vehicle has become partially submerged and the extent to which it is submerged. The temperature and carbon monoxide sensors can be used to detect whether a fire has started within the vehicle. The communication from the main control unit (MCU) to the remote facility may also indicate whether the vehicle has become submerged or is on fire.

The sensors configured to detect moisture, pressure, temperature and carbon monoxide may be provided separately to the impact sensors or may be formed integrally therewith. A fire within the vehicle and the extent to which it has spread can be detected by measuring which sensors register temperatures above a predetermined threshold. The use of carbon monoxide sensors can also provide an indication of the severity of a fire within a vehicle. Registering whether a vehicle has been submerged and the extent to which it has been submerged can be determined by measuring which sensors register a humidity level above a predetermined threshold. The use of pressure sensors can also provide an indication of the extent to which a vehicle is submerged.

In addition to a receiver and an emitter, the impact sensors may also comprise read only memory (ROM), random access memory (RAM), fuses, voltage smoother, battery and a communications. Examples of sensors capable of detecting impact include accelerometers; displacement sensors such as a linear variable differential transformer; sensors based on time-of-flight measurements; sensors based on phase monitoring measurements; sensors based on the angle or direction at which the signal arrives at the receiver and sensors based on received signal strength.

Displacement sensors based on linear variable differential transformers produce an electrical signal indicative of the distance that each sensor moves relative to its steady state over the duration of impact. The electrical signals from each of the impact sensors can be used to calculate the distance of each sensor relative to the other sensors post-impact. As before the distance measurements can be used to calculate the extent of displacement of each sensor as a result of the impact. A displacement exceeding a predetermined value at one or more locations indicates that the vehicle has been subjected to an impact that can be classified as an accident at that location. The magnitude of the displacement is indicative of the severity of the impact.

Time-of-flight sensors typically include a light emitter and a light detector. The distance between each sensor and any other sensor may be determined by measuring the time it takes for a pulse of light or sound emitted from a first sensor to be reflected off a surface of another sensor and be detected at the receiver of the first sensor. As before changes in relative displacement between sensors can be calculated by measuring changes in the time taken for the light beam to travel between sensors and back. Alternatively, if the system comprises sensors having synchronised watches, distance calculations can be made simply by measuring the time it takes for a pulse of light to travel from one sensor to another. Furthermore, time of flight sensors can make use of a continuous modulated light source instead of pulses of light. In this case distance calculations are made by measuring the phase of the reflected light. Examples of sensors used for time-of-flight measurements include ultrasonic distance sensors, infra-red triangulation sensors; infra-red laser sensors; and LED sensors.

Sensors comprising accelerometers typically use piezoelectric and/or piezoresistive elements to measure forces generated on impact, which force measurements can be used to calculate the post-impact displacement (length and direction) of each sensor from its original position. Using displacement calculations for each of the impact sensors in the system, it is possible to determine the post-impact distance of each impact sensor from the other impact sensors in a group or system, its location and its extent of displacement relative to other sensors and calculate the severity of an impact. For example, if one or more sensors in a group or the system is displaced by more than a threshold amount, it can be determined that the vehicle has experienced an impact that can be classified as an accident. The system will then automatically generate a request for emergency assistance to the remote facility.

The impact sensors may be connected to each other via a network of electrical wires or fiber optic cables. Alternatively, the impact sensors may be wirelessly connected to one another. Where the impact sensors form part of a wired network, distance calculations can be made by measuring the phase shift in the electronic waves transmitted via the network to determine the distance between sensors.

Preferably impact sensors selected from the group comprising ultra-sonic distance sensors, infra-red triangulation sensors, infra-red laser distance sensors, infra-red light emitting diode time of flight sensors or sensors based on phase shift measurements and the like also comprise an accelerometer. The accelerometer can supplement or double-check the distance measurements taken by the other sensors; its presence can help to provide a rapid determination of the distance and direction of travel of the impact sensor as a result of the impact. Furthermore, the presence of the accelerometer can provide a back-up distance measurement in the event that the impact severs or displaces one or more wires in a wired network or interrupts or eliminates previously established wireless communication paths between sensors. The force measurements registered by each accelerometer in the impact sensor can be used to determine the distance and direction of travel moved by each sensor on impact. This means that the system can continue to provide an emergency signal in the event that direct communication between sensors is impeded for any reason.

More preferably the impact sensors each comprise an ultrasonic distance sensor, an infra-red triangulation sensor, an infra-red laser distance sensor or an infra-red light emitting diode time of flight sensors; a sensor based on phase shift measurements and the like and an accelerometer. The sensor based on phase shift measurements provides the principal route for determining the distance between sensors with the ultra-sonic distance sensor, the infra-red triangulation sensor, the infra-red laser distance sensor or infra-red light emitting diode time of flight sensors providing a back-up measurement, particularly for wired systems where the cabling may be severed in the event of an impact. Finally, the accelerometer can provide additional information on the distance and direction moved by the impact sensors in the event of an impact.

BRIEF DESCRIPTION OF THE DRAWINGS

The invention will now be described with reference to the following non-limiting figures in which:

FIGS. 2A to 2F illustrate the arrangement of sensors on a car.

DETAILED DESCRIPTION

Figure 1:
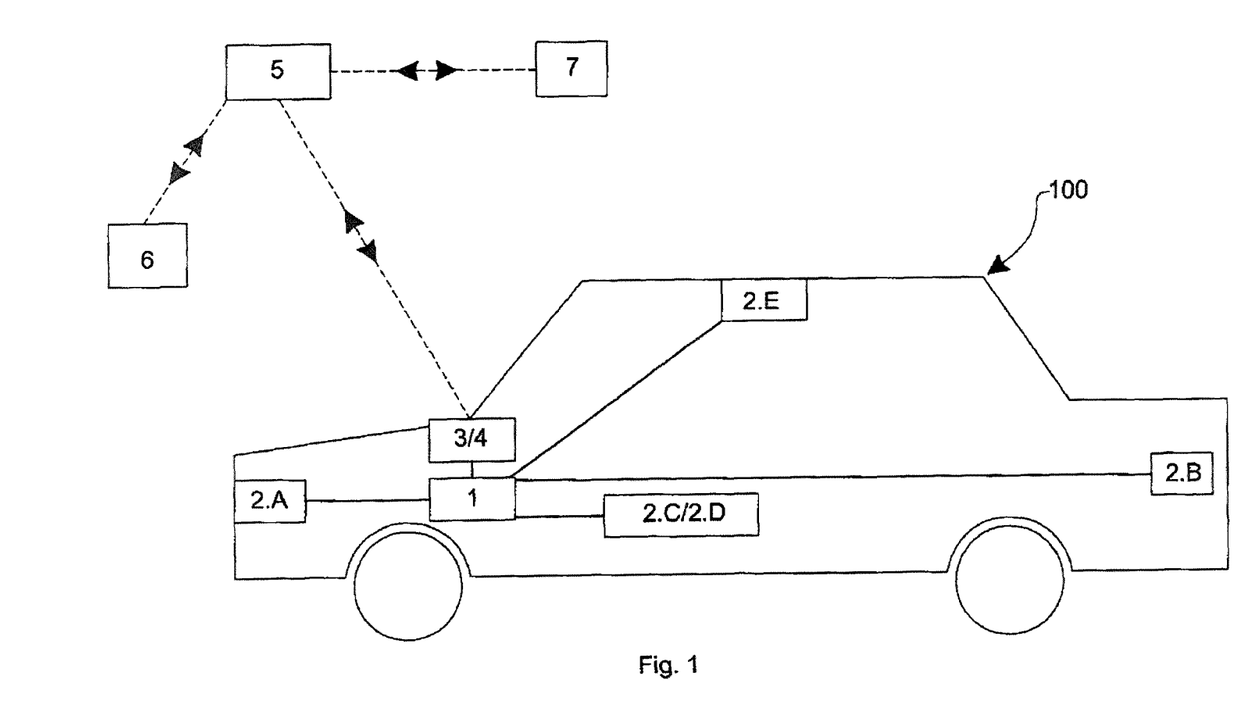
FIG. 1 is a schematic representation of a system of the present invention, showing the communication of the system being with a remote facility.
Figure 2A:
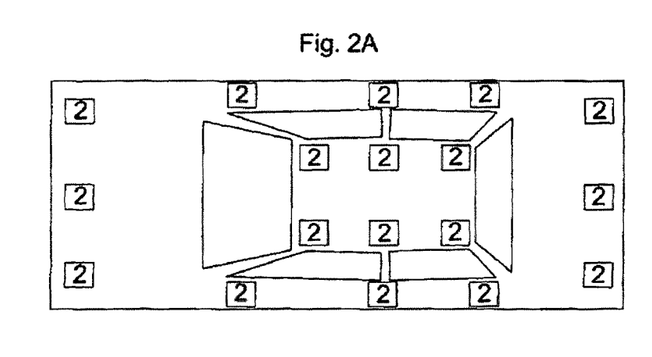
Figure 2B:
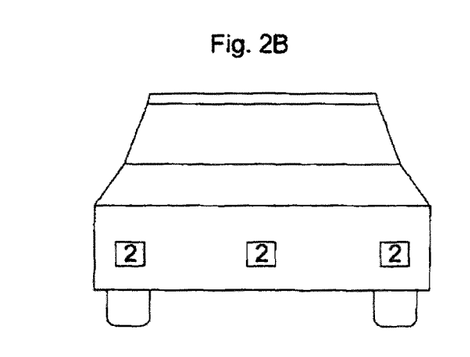
Figure 2C:
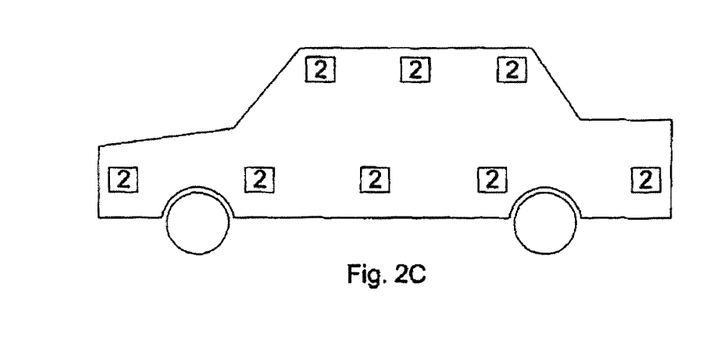
Figure 2D:
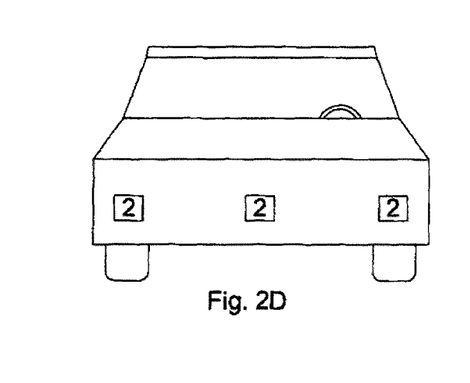
Figure 2E:
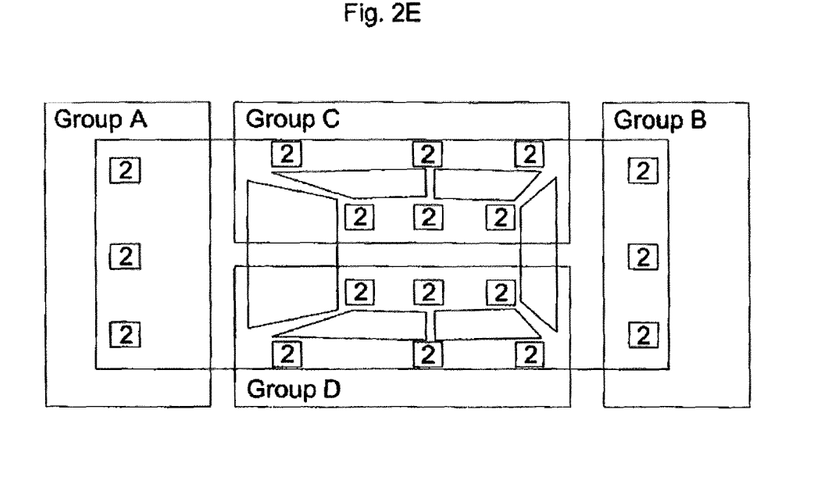
FIG. 2E illustrates the arrangement of the sensors into groups.
Figure 2F:
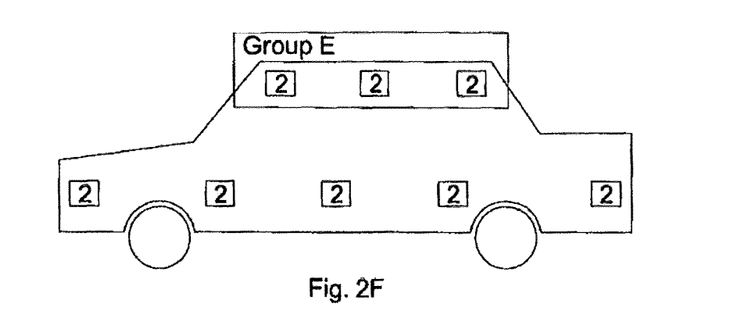
Figure 3A:
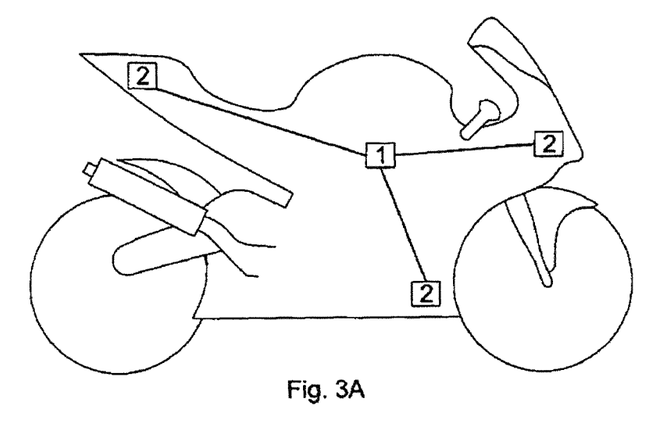
FIGS. 3A-3D illustrate the arrangement of sensors on a two-wheeled vehicle, such as a motor bike.
Figure 3B:
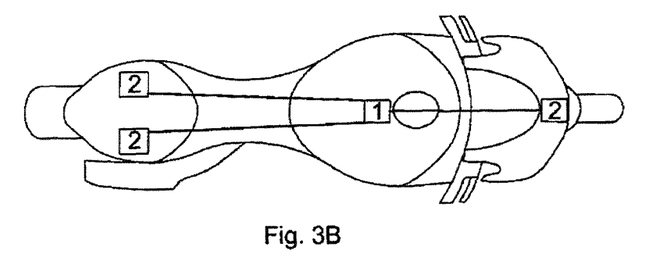
Figure 3C:
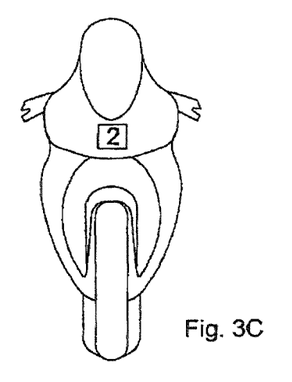
Figure 3D:
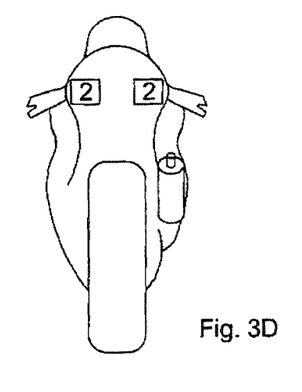
Figure 4:
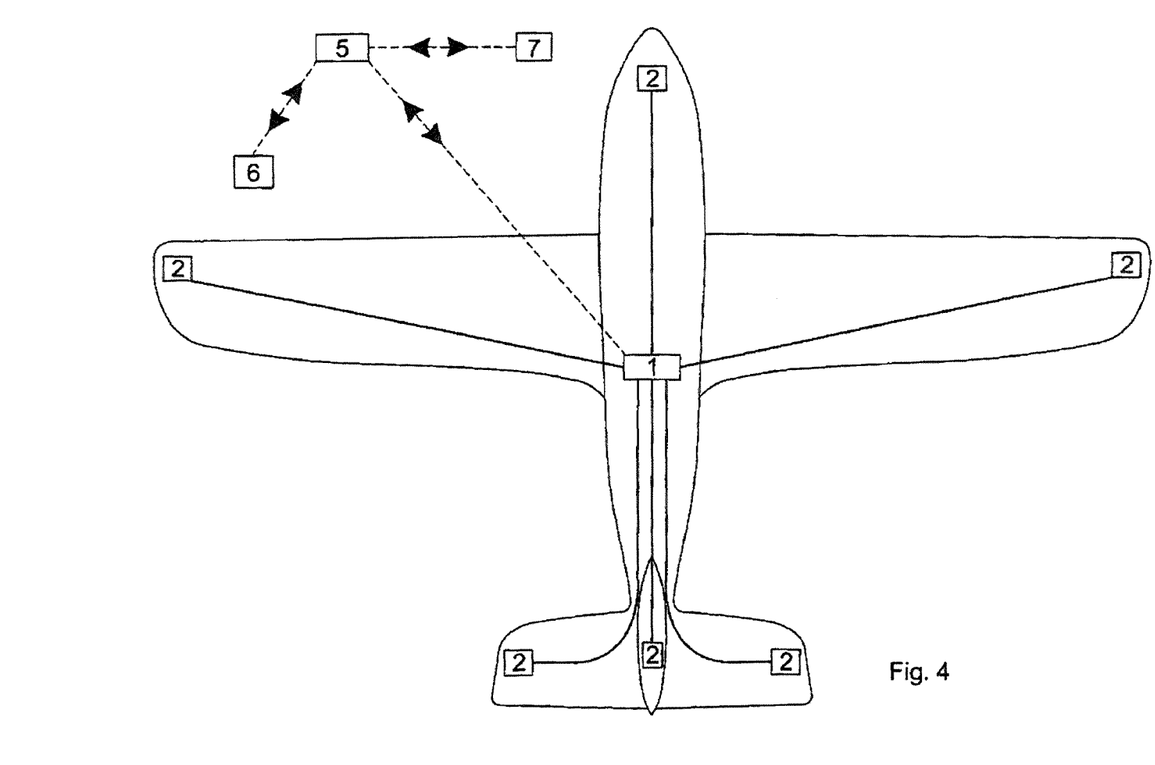
FIG. 4 illustrates the arrangement of sensors on an aircraft.
Figure 5:
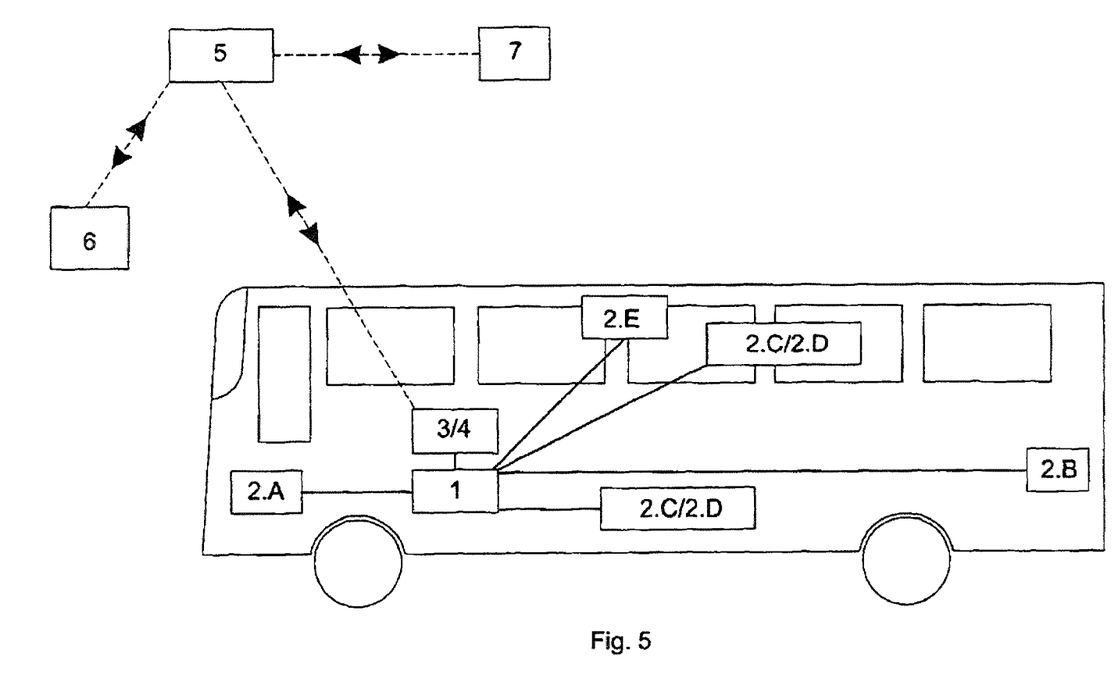
FIG. 5 illustrates a system installed on a bus
Figure 6:
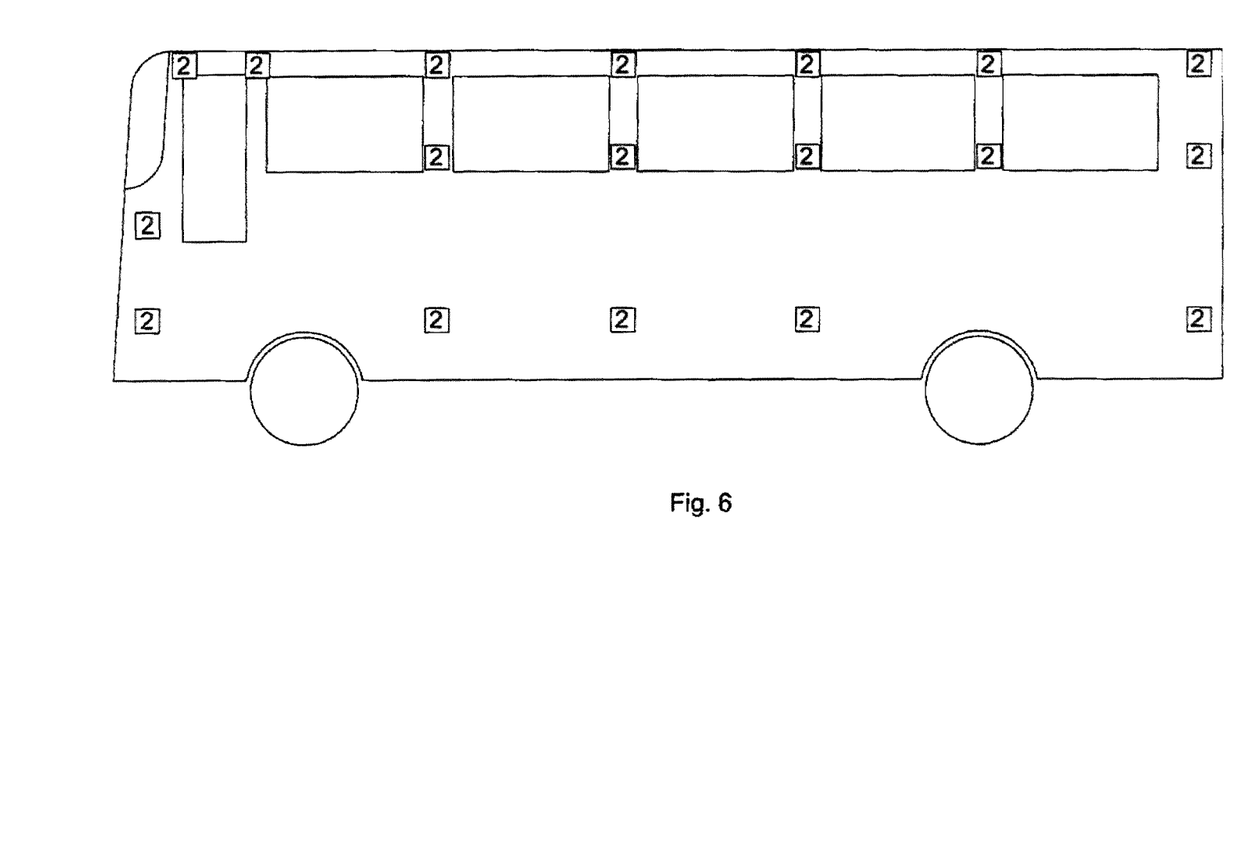
FIG. 6 illustrates the arrangement of sensors on a bus
Figure 7:
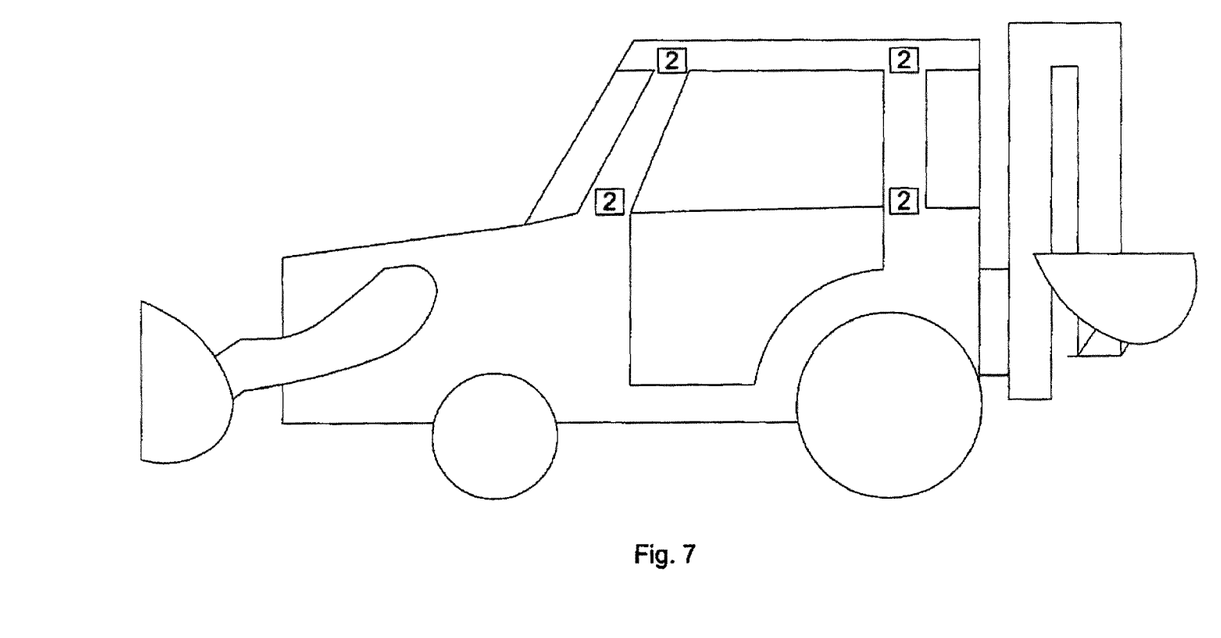
FIG. 7 illustrates the arrangement of sensors on tractor or digger
Figure 8:
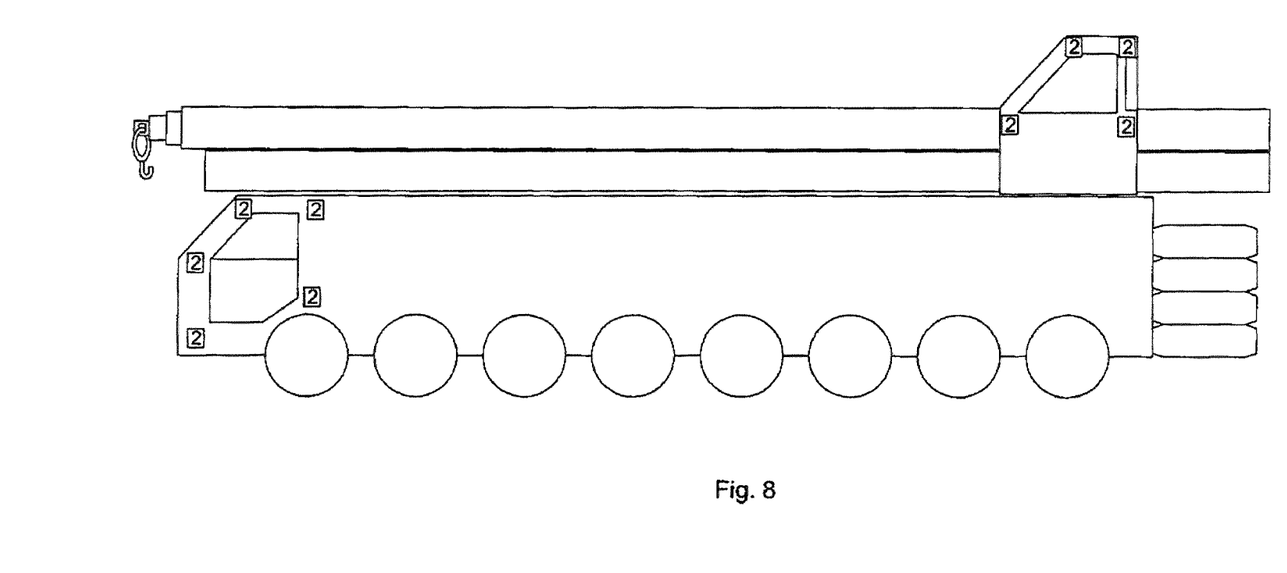
FIG. 8 illustrates the arrangement of sensors on a crane

The system illustrated in FIG. 1 is designed to reduce the time between vehicle impact and the arrival of an emergency responder at the scene of an accident. The system is installed in a vehicle (100) and includes a main control unit (1) and a plurality of sensors (2) arranged at weak points over the chassis or body of the vehicle (FIGS. 2A to 2D). The sensors (2) are preferably arranged into groups (FIG. 1, FIG. 2E and FIG. 2F). Sensors at the front of the vehicle are designated group 2A; sensors at the back of the vehicle are designated group 2B; sensors on the side of the vehicle are designated groups 2C and 2E respectively. Sensors on the group of the vehicle are designated group 2F. A car is illustrated in FIGS. 1 and 2, but it will be appreciated from FIGS. 3 to 8 that similar arrangements can be used for other vehicles.

The sensors (2) can communicate or interact with each other and the main control unit (1) via pre-determined communication paths. Wired or wireless communication means, including electrical and optical fibers, cellular, radio and satellite can be used to transmit signals from one sensor to another or from one or a group of sensors to the main control unit. Communication paths between the main control unit and the impact sensor groups 2A, 2B, 2C, 2D and 2E and unit 3,4 are illustrated in FIG. 1. These paths can be wired (electrical or optical) or wireless. Wireless communication between the wireless or satellite transmitter (3,4) and the remote units (5,6,7) is also illustrated. The vehicle may include cellular, radio or wireless (3) and/or satellite (4) transmitters to transmit a signal encoding an emergency request generated by the main control unit (1) to a receiving station (5), which forwards the signal to a remote facility (7) where the signal is decoded. Alternatively, a remote central processing unit (6) is provided, which decodes the signal before forwarding it to the remote facility (7).

Figure 9:
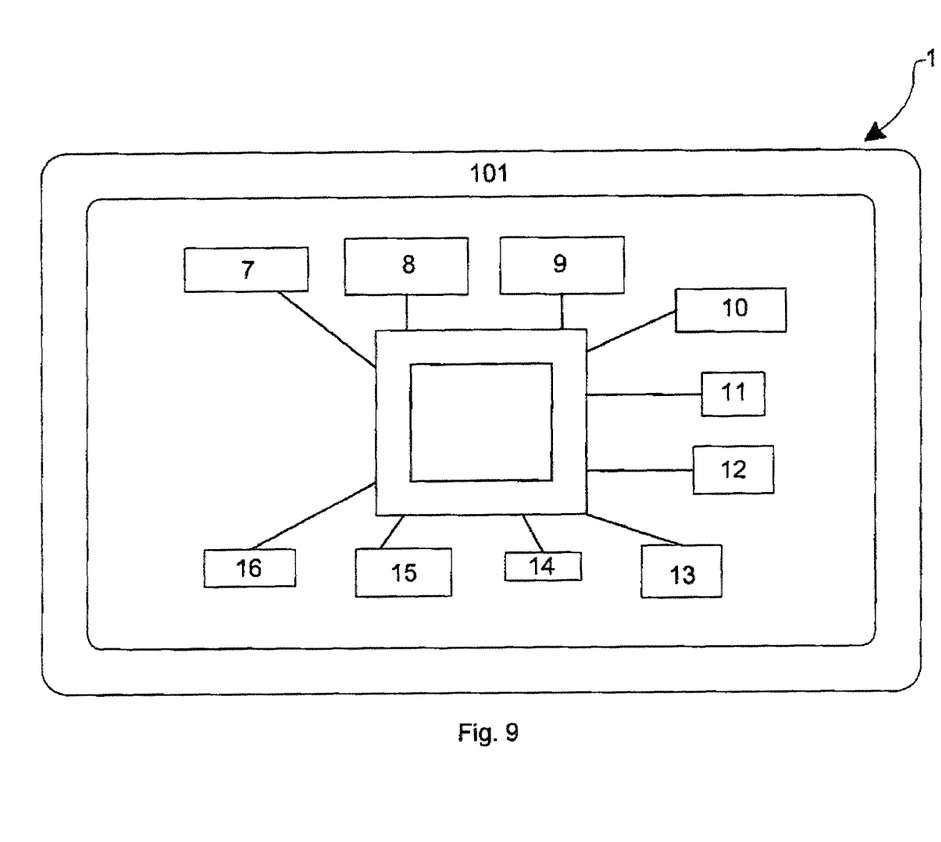
FIG. 9 is a schematic representation of a main control unit (MCU)

The main control unit (MCU) (1) (FIG. 9), comprises a water and impact-resistant housing (101) within which is contained one or more of a local central processing unit (CPU) (6); a GPS or GSM module (7); one or more SIM card slots (8); optional empty slot (9) for facilitating upgrades; an aerial (10); RAM (11); ROM (12); a battery (13); fuses (14); a voltage smoother (15) and slots (16) to facilitate upgrades. The main control unit may optionally also comprise a receiver and a transmitter to transfer information from the impact sensors and optionally information gathered via the electronic control units (ECU) to the remote facility. It may also comprise one or more of a phase measuring device and a device configured to measure oscillation.

Figure 10:
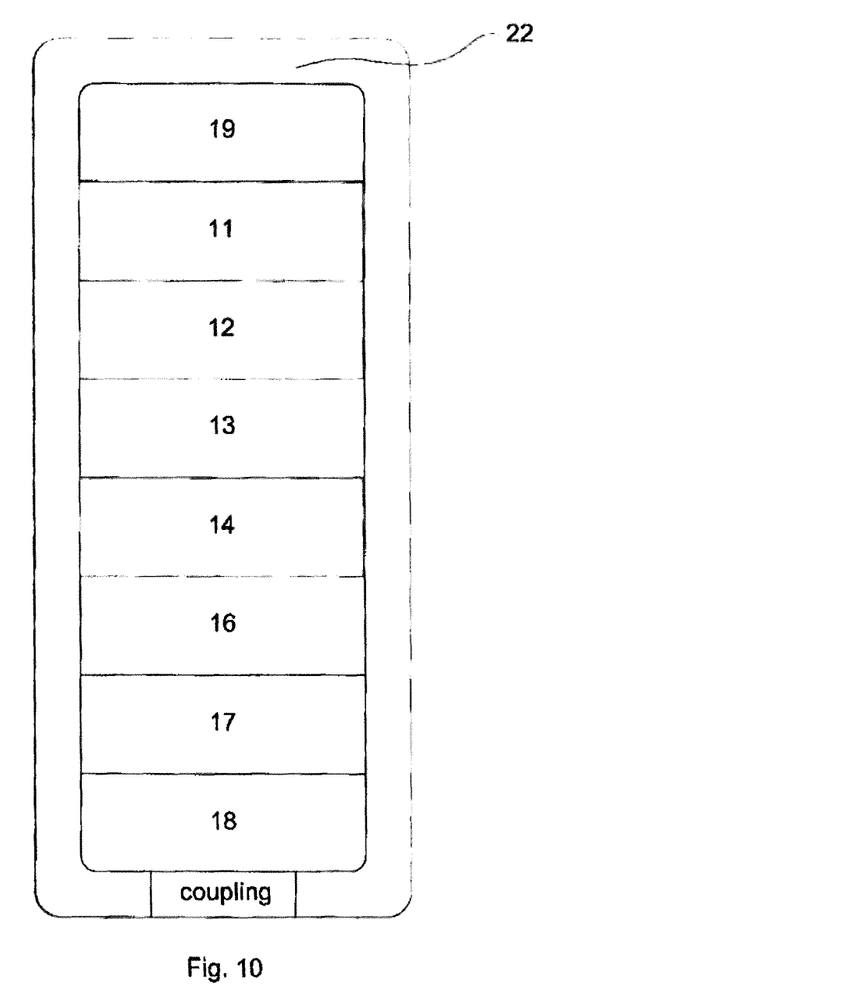
FIG. 10 is a schematic representation of an impact sensor.

Each sensor (2) (FIG. 10) comprises a water and impact-resistant housing (22). Contained within sensor housing (22) are one or more components selected from RAM (11); ROM (12); a battery (13); fuses (14); slots (16); external communication coupling hardware (17); temperature and humidity detector (18). A transmitter and receiver (19) are also provided to facilitate communication between sensors and between sensors and the main control unit.

Figure 11:
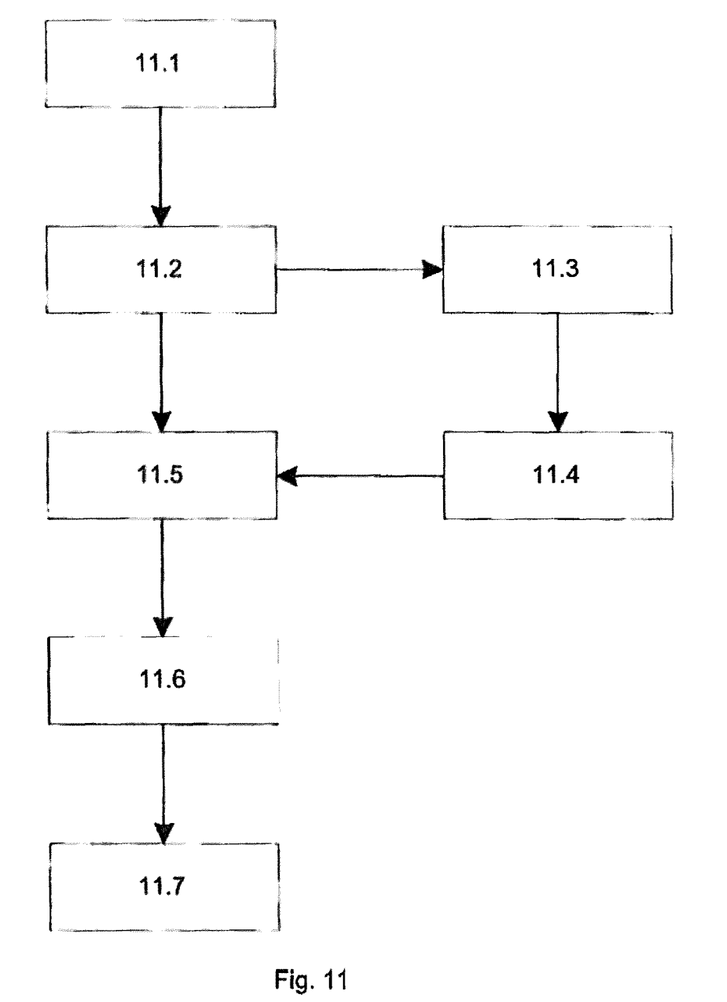
FIG. 11 is a flow diagram illustrating the method of the present invention.

FIG. 11 is a flow diagram illustrating the method of the present invention. The vehicle is turned on with the vehicle in the stationary position at 11.1 at which point one or more of the electronic control systems provided on the vehicle conduct an error check as part of a start-up sequence to determine that the basic functions of the vehicle are all operating correctly. If an error is detected, the vehicle informs the driver at 11.2, either through the use of a visual signal such as a service light or via an audible alarm. If the error cannot be immediately addressed a service request is issued at 11.3 so that the issue can be resolved. Once the error is resolved the vehicle continues with the start-up sequence at 11.4 by measuring the distance between sensors, determining their locations and storing each sensor location at a designated stationary location address within a library in the main control unit. The step of measuring distances between sensors may include the step of measuring the distance between each sensor and every other sensor of the vehicle; measuring the distance between selected sensors in a group and/or measuring the distance between each sensor within a group and measuring the distance between each sensor in a group and one or more sensors in a neighbouring group. For example, an end sensor in group 2A could communicate with the middle sensor in group 2A as well as one or more sensors in either group 2C or group 2D. Preferably the method uses a predetermined signalling pattern between sensors for measuring the distance between sensors within a group and optionally between groups in a system and uses these distance measurements to calculate the stationary location of each sensor. Where the sensors are connected via an electrical wire or a fibre-optic cable, each impact sensor may be configured to communicate with every other impact-sensor on the vehicle.

In the event of an impact at 11.5 the system measures the post-impact distance between sensors using an identical signalling pattern as before and uses this information to calculate the post-impact location of each impact sensor. The system compares the post-impact location data with the stationary location data and uses this information to calculate the extent to which one or more sensors have been displaced from their stationary positions as a result of the impact. The library of the main control unit also stores data detailing controlled post-impact location information for the vehicle generated as a result of either factory crash-testing or crash testing carried out by an independent agent under different controlled impact conditions. Using this library of information, the main control unit then compares the extent of displacement of each sensor as a result of the impact at 11.5 with the reference displacement values generated under controlled conditions to determine the severity of an accident.

The distance measurements made in response to an impact at 11.5 may be carried out before deployment of an airbag, after deployment of an airbag or simultaneously. In addition to the determination by the main control unit of the distances between sensors and their post-impact locations, the vehicle may also deploy sensors which check and report tyre pressure (including whether the tyres are flat), check and record which seat belts are engaged, check and report which airbags are deployed, the temperature and humidity within the vehicle cabin and the GPS coordinates of the vehicle.

If the post-impact location of the sensors suggests that severity of the impact is sufficient to be classified as an accident, the main control unit (1) communicates this information at 11.6 via a transmitter (3,4) provided in the vehicle to an external receiver (5). The external receiver (5) forwards the signal to a central processor (6) and a remote facility (7). The signal is preferably decoded at (6) and the severity of the accident is registered. The remote facility then contacts the emergency responder and instructs them to attend the accident at 11.7.

The system (1,2) suitably forms part of an onboard network system with one or more electronic control units provided in the vehicle. The system of the present invention may be installed into the vehicle on manufacture or it may be installed later. In addition to the information detailing the severity of the accident determined by measuring the distances between the impact sensors, the main control unit (and optionally transmitters (3,4) where present) collect data generated by sensors in one or more of the electronic control units provided by the vehicle to provide the emergency responder with information such as vehicle occupancy, vehicle location, cabin temperature, cabin humidity, fuel tank status, air-bag status and door-lock status. This can be useful to the emergency responder as it provides an indication about potential hazards that will be encountered at the scene of the accident.

Furthermore, an electronic control unit (ECU) provided in the vehicle may include a library of information such as vehicle registration number, vehicle owner, the identity of the insurance company and the Bluetooth signature of the vehicle and the passengers. This information may also be forwarded to the remote facility to assist the emergency responder, where necessary.

In vehicles such as lorries, buses, coaches, motorcycles, cranes, tractors and aircraft, the impact sensor positions are constantly monitored and an emergency signal is generated in the event that any or a group of sensors is displaced beyond a threshold value.

What is claimed is:

1. A method for notifying a remote facility of a vehicle accident, the method comprising the steps of:
   providing a system comprising a plurality of impact sensors at multiple locations around the vehicle;
   storing the multiple locations of the impact sensors when the vehicle is in a stationary position to provide a library of stationary locations of the plurality of impact sensors, each impact sensor of the plurality of impact sensors having an associated stationary location in the library;
   determining a post-impact location of each impact sensor in the event of an impact;
   determining if any sensor has been displaced from the associated stationary location as a result of the impact;
   determining a severity of the impact by calculating the extent of displacement of each impact sensor from the associated stationary location; and
   automatically informing the remote facility that there has been an accident if it is determined that the extent of displacement as a result of the impact is greater than a threshold amount; and
   each impact sensor configured to communicate with at least one of the other impact sensors and the step of determining if any impact sensor has been displaced from the associated stationary location on impact includes the step of creating a communication path between an impact sensor and at least one of the other impact sensors thereby to determine the post-impact location of each impact sensor as a result of the impact and using the library of locations to compare the post-impact location of each impact sensor with the associated stationary location to determine an extent of displacement and if the extent of displacement exceeds a threshold value automatically informing the remote facility.

2. A method according to claim 1, wherein the system comprises a main control unit (MCU) and multiple impact sensors and each impact sensor communicates with at least one other sensor and with the main control unit (MCU).

3. A method according to claim 1, wherein the impact sensors are located at points on a body and/or a frame structure of the vehicle which deform as a result of an impact or collision.

4. A method according to claim 1, wherein each impact sensor comprises a shock-resistant housing and internally situated sensing means, wherein the housing is configured to protect internally situated sensing means in the event of an accident.

5. A method according to claim 1, wherein each impact sensor comprises a receiver and a transmitter.

6. A method according to claim 2, wherein the main control unit (MCU) comprises a library of stationary locations and a library of post-impact locations generated during controlled crash testing, wherein the MCU records the extent of displacement of each impact sensor in the event of an accident and calculates the severity of the impact using the library of post-impact locations.

7. A method according to claim 2, wherein the main control unit (MCU) informs the remote facility of the event of an accident.

8. A method according to claim 2, wherein the vehicle also comprises an electronic control unit (ECU) and the main control unit (MCU) also gathers information from the electronic control unit (ECU) of the vehicle.

9. A method according to claim 1, wherein the location of each impact sensor is calculated by using a pre-determined signalling interaction routine.

10. A method according to claim 1, wherein the impact sensors are arranged as groups on the body and/or frame of the vehicle.

11. A method according to claim 1, wherein the impact sensors are selected from the group comprising ultra-sonic distance sensors; infra-red triangulation sensors; infra-red laser distance sensors; infra-red light emitting diode (LED) time of flight distance sensors; accelerometers and sensors based on phase shift distance measurements.

12. A method according to claim 2, wherein the vehicle comprises airbags and the main control unit (MCU) determines the extent of displacement before the airbags are deployed.

13. A method according to claim 12, wherein the main control unit (MCU) determines the location of the impact sensors after the airbags are deployed.

14. A method according to claim 1, wherein the impact sensors further comprise one or more means selected from the group of means for measuring temperature within the vehicle; means for measuring carbon monoxide levels within the vehicle and means for detecting moisture levels within the vehicle.

15. A method according to claim 1, wherein communication between the system and the remote facility is achieved via the use of radio waves or micro-waves.

\* \* \* \* \*